Oct. 14, 1941.  R. G. A. WEISS  2,259,235
FILTER
Filed Jan. 17, 1941
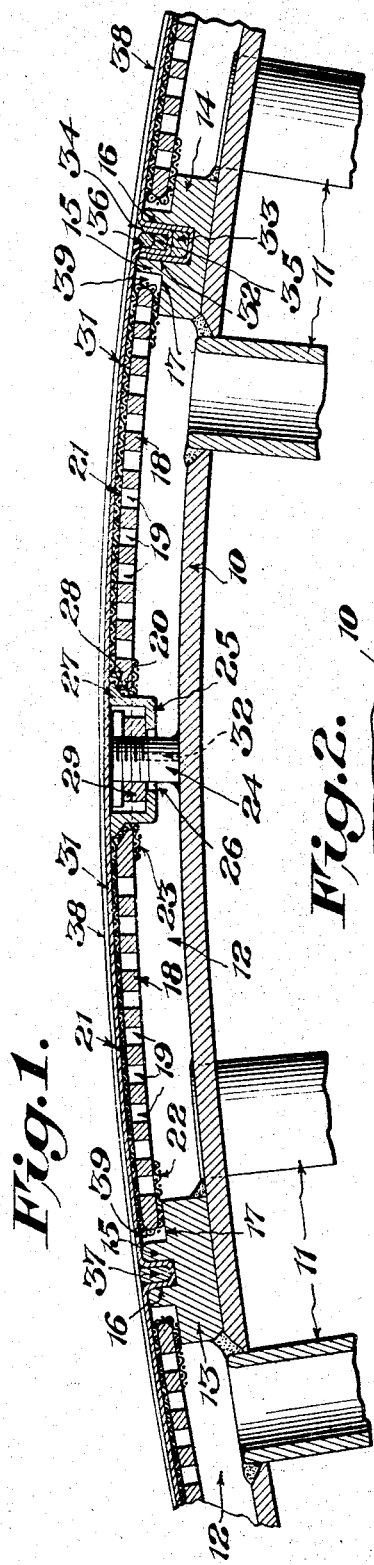
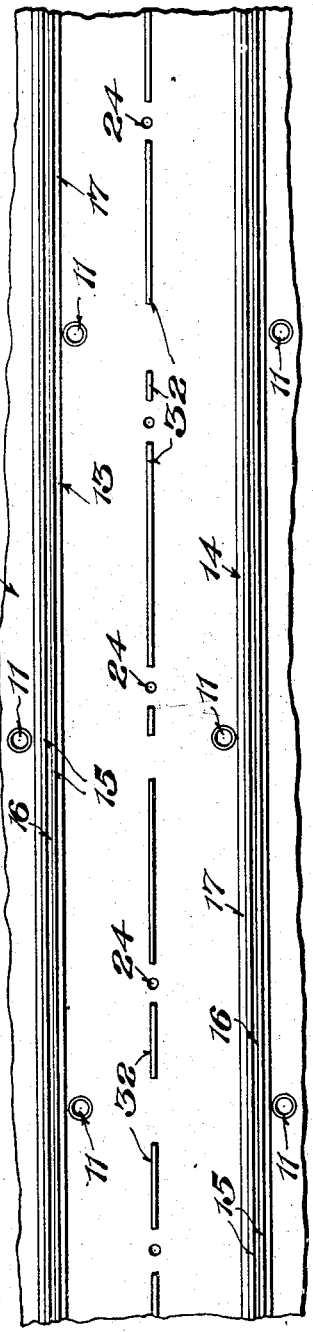
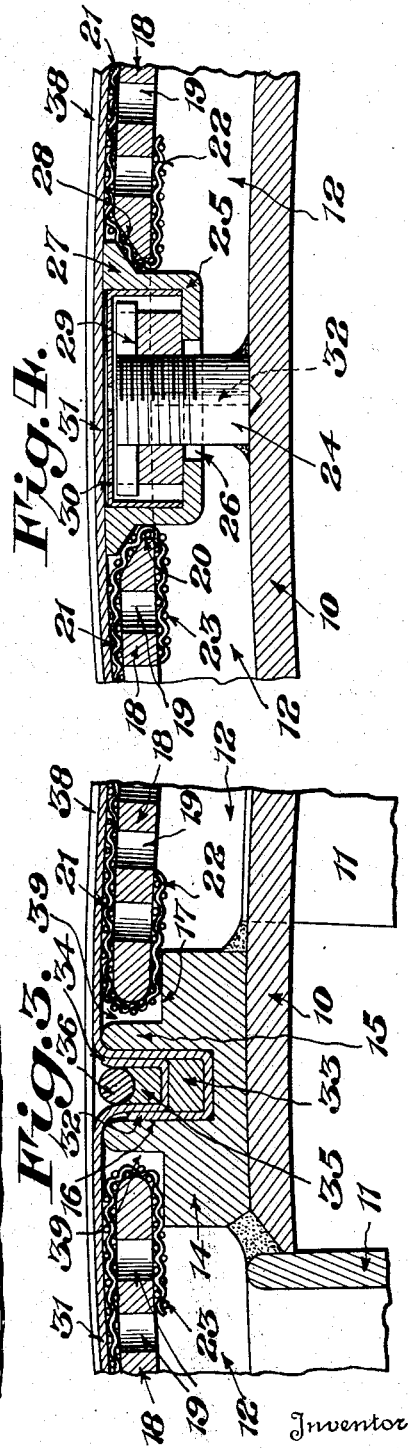
Inventor
Robert George Albert Weiss
By Arthur Middleton
Attorney Patented Oct. 14, 1941

2,259,235

UNITED STATES PATENT OFFICE 2,259,235

FILTER

Robert George Albert Weiss, Cold Meece, near Stone, England, assignor to The Dorr Company, Inc., New York, N. Y., a corporation of Delaware Application January 17, 1941, Serial No. 374,837

7 Claims. (Cl. 210—199)

This invention relates to filtration and particularly to continuous drum or rotary vacuum filters. More specifically, the invention comprises certain novel improvements in what is generally termed the drainage deck of a rotary vacuum filter, as well as to a novel means and manner of dividing the deck or drum surface into filter sections.

One of the prime objects of the invention is to provide a drainage deck or filter cloth supporting surface for rotary vacuum filters which will be strong and rugged and easily and readily positioned on the drum or removed therefrom, while at the same time will be capable of expanding or contracting under extreme changes in temperature conditions without materially affecting the filter assembly or placing any strain upon the component parts thereof. Such a structure and arrangement is particularly attractive in the filtration of certain substances, for instance, the de-waxing of oils, wherein the fitler sections of the drum may be subjected to temperatures varying as much as from —20° F. to 212° F. in a single revolution of the drum.

Another object of the invention is to provide a simple and effective means of attaching the filter medium or cloth upon the surface of the drum and to hold the same securely but detachably thereon.

A further object of the invention is to provide a novel arrangement in the filter deck assembly, including filter medium and supporting surface therefor, which can be readily changed, adjusted, or repaired in a quick and simple manner without the necessity of any soldering or welding, which operations are undesirable, if not impossible when the filter is operating with substances of a volatile or inflammable nature.

With these and other objects in view, the invention consists in the construction and novel combination and arrangement of parts hereinafter fully described, illustrated in the accompanying drawing, and particularly pointed out in the appended claims, it being understood that various changes may be made in the size, proportion and minor details of the construction within the scope of the claims without departing from the spirit of the invention or sacrificing any of the advantages thereof.

In the drawing:

Figure 1 is a fragmentary cross-sectional view of a filter drum embodying the features of the present invention, the view being taken in a plane substantially at a right angle with the axis of the drum;

Fig. 2 is a plan view of the filter drum embodying features of the invention, on a reduced scale, and with the filter medium and its supporting means removed;

Fig. 3 is an enlarged vertical cross-sectional view of one of the division strips embodying features of the invention; and Fig. 4 is an enlarged vertical section showing the means for holding the filter cloth supporting member securely in position upon the drum.

Referring to the drawing, the numeral 10 designates a fragment of a filter drum provided with the usual drainage pipes 11, it being understood that the drum 10 supports a suitable filter medium and has its lower portion immersed in a trough containing the mixture to be filtered, through which the drum continuously revolves. The drainage pipes 11 communicate with a central axial pipe into which the filtrate is drawn when vacuum or suction is applied to the drainage pipes 11 of each filter section as it passes through the trough.

The surface of the drum 10 is divided into a plurality of non-communicating sections 12 by means of division strips extending longitudinally of the drum and of which two, 13 and 14 are shown in Figure 1. These division strips are preferably permanently secured to the drum surface 10 by welding or by other satisfactory means. The division strips 13 and 14 are of somewhat peculiar shape, being provided with a pair of upstanding portions or ears 15 to form therebetween a longitudinal groove 16 running the length of each strip. Each division strip is also so formed to provide the laterally and longitudinally extending shoulders or shelves 17, the purpose of which will presently appear.

The lateral shoulders 17 of each division strip provide shelves or supporting surfaces upon which rest the longitudinal edge portions of a filter medium supporting element in the form of relatively a rigid plate 18, one of which extends the length of the filter drum between each division strip supported at its opposite longitudinal sides on the shoulders 17 as just described. The filter cloth supporting member or plate 18 is provided with numerous perforations 19, substantially throughout its area in order that the liquid or filtrate drawn through the filter medium may pass through these perforations 19 and ultimately through the drainage pipes 11. In the preferred construction, the plate 18 is also provided with a series of aligned openings 20 extending longitudinally and substantially centrally of the plate. These openings are adapted to accommodate appropriate elements or means for securely holding the plate 18 in position on the drum with its longitudinal edges resting on the shoulders 17 of the division strips, as will hereinafter more fully appear.

It is generally desirable to provide an intermediate filter cloth supporting medium above the surface of the plate 18. To this end, a relatively coarse mesh wire cloth 21 is positioned on the upper surface of the plate 18, with its edges folded over and under the longitudinal edges of the plate, as indicated at 22, to rest upon the lateral shoulders 17 of the division strips. Thus, the intermediate supporting medium 21 is securely and firmly held stretched in place on the upper surface of the plate 18, but in a quickly and readily detachable manner. At each of the aligned central openings 20 of the plate 18, the intermediate supporting material 21 is also provided with a registering opening, the edges thereof being folded over and under the edges of the plate opening 20, as indicated at 23.

In the preferred arrangement the filter drum 10 is provided with a plurality of aligned permanently attached studs 24 so arranged as to register with and extend into each of the plate openings 20, the studs 24 preferably being screw-threaded, as shown. A bushing or washer 25 is adapted to be loosely received on each stud 24, and this bushing 25 preferably takes the form substantially of a cup, having an opening 26 in its bottom, of a diameter relatively large as compared with that of the stud 24, in order that the cup-like bushing may fit over the stud in a relatively loose fashion. The upstanding side wall of the bushing 25 is provided with an annular outwardly extending shoulder 27, the under surface of which is preferably beveled to cooperate with a correspondingly beveled surface 28 at the edge of the opening 20 through the plate 18. A lock nut or other suitable screw-threaded element 29 is adapted to be screwed down onto the screw-threaded end of the stud 24, and force the bushing 25 downwardly thereon, until the beveled shoulders 27 contact with and bear against the intermediate filter cloth supporting medium, where the same is folded over the beveled edges 28 of the plate opening 20. Thus, the nut 29 and its cooperating bushing 25 may be adjusted so as to securely hold the plate 18 and intermediate supporting medium 21 in position. At the same time, the relatively large opening 26 through which the stud 24 extends permits a substantial amount of movement of the plate 18 and bushing 25 in any lateral direction as a consequence of expansion or contraction in the plate 18 and wire cloth 21, incident to sharp and wide changes in temperature. Preferably, a sheet metal shield or sealing member 30, in the form of an inverted cup and having a relatively tight fit within the interior of the bushing 25, is slipped thereinto to cover the nut 29 and present a smooth plane surface thereover, and at the top of the bushing 25 so that the filter cloth 31 may have a smooth surface presented to it over the plate hold-down means. In order to limit the downward movement of the plate 18, there extends longitudinally along the surface of the drum 10 and in line with the studs 24, a series of interrupted ridges 32 which rise to approximately the same height above the surface of the drum 10 as do the shoulders 17 of the division strips. Thus, upon being forced downwardly and secured in position by the central attaching and holding means, the plates 18 are limited centrally so that they will not be sprung or forced downwardly a distance any greater than the height of the shoulders 17. This assures the maintenance of a predetermined minimum drainage space between the surface of the drum 10 and the supporting plate 18.

As is well known, the filter medium 31, which is generally a woven fibrous material or cloth, is stretched around the entire periphery of the drum and drawn taut over the outer surface of the wire mesh material 21. This cloth is preferably placed around the cloth supporting members in a continuous and uninterrupted sheet, the two opposite edges of which are shown and received within the groove 16, provided in the division strip 14, the groove in this particular division strip preferably being somewhat deeper than the similar groove in the other division strips in order to accommodate and securely hold the two loose ends of the filter cloth. In the preferred arrangement, one end 32 of the cloth is positioned in the groove 16 to fit snugly against the bottom and both side walls thereof, and a wedge or calking member 33 of wood, lead, or other appropriate substance, is forced into the groove in order to tightly wedge the loose end 32 therein. The opposite loose end 34 of the filter cloth is then inserted into the groove and securely wedged therein by means of a wedge or calking element 35 similar to the wedge 33. If desired, spacing rod 36 may overlie the calking 35 to securely hold the same against displacement and may be anchored in suitable manner at either end of the drum.

At each of the other division strips, such as 13, the filter cloth 31 is folded or forced down into the groove 16 and then securely and tightly wedged therein by means of a suitable wedge or calking element 37. It will be readily appreciated that any slack in the filter cloth can be taken up and the same caused to be stretched tightly around the drum by forcing a suitable amount or extent of the cloth into the respective grooves 16. After the filter cloth is thus stretched around the drum on the supporting surfaces 18 and 21 and secured in place by the wedging just described, the usual wire winding 28 may be placed around the drum over the outside surface of the filter cloth in a manner well known in the art.

From the foregoing description, it will be appreciated that the various parts of the filter drainage deck of the present invention may be quickly and readily assembled upon the drum, removed therefrom, and substitutions made, or repaired with the utmost ease and dispatch. It will be further appreciated that soldering or the use of heat, undesirable when the filter is being used with materials of a combustible nature, are entirely dispensed with and the various changes, such as replacement of filter cloth, may be accomplished by the use of a few mechanical manipulations.

Since one of the prime purposes of the invention is to provide a drainage deck which may freely expand and contract under the influence of rapid and wide temperature fluctuations without imposing serious and disruptive strains upon other parts of the filter drum, the plate member 18 is so proportioned as to provide at practically all times a substantial space or clearance between the longitudinal edges thereof and the upstanding ears 15 of the division strips, as indicated at 39. As clearly described above, the central hold-down bushings or washers 25 are designed to allow considerable lateral movement with respect to the studs 24. Thus, it will be readily appreciated that the plate 18 and the intermediate filter cloth supporting material 21 may readily expand in either or both directions as well as to contract correspondingly without imposing any substantial stress or strain upon the various elements constituting and associated with the drainage deck.

While the central hold-down assembly, comprising the studs 24, cup-shaped bushings 25, and lock nuts 29, have been found to be desirable in the construction of the present invention, it is to be understood that the broader features of the present novel drainage deck and arrangement are not limited to this specific hold-down means, but such means may take any desired form that will serve the purpose of securing the plate 18 in place upon the shoulders 17 and permit a desired amount of lateral movement thereof incident to expansion and contraction under the influence of temperature changes. It is also understood that other or additional intermediate filter cloth supporting elements may be utilized in a manner known to those skilled in the art.

What is claimed is:

1. In a drum type filter, a filter section comprising a pair of division strips extending longitudinally of the drum and having lateral shoulders, a relatively rigid perforate plate supported at its opposite longitudinal sides upon said shoulders, means between the edges of said plate for holding the same in position against displacement, filter cloth extending over said plate, and means for securing said cloth in position over the surface of said plate.

2. In a drum type filter, a filter section comprising a pair of division strips extending longitudinally of the drum and having lateral shoulders, a relatively rigid perforate plate supported at its opposite longitudinal sides upon said shoulders, adjustable means between the edges of said plate for detachably holding the same in position against displacement, filter cloth extending over said plate, and means for securing said cloth in position over the surface of said plate.

3. In a drum type filter, a filter section comprising a pair of division strips extending longitudinally of the drum and having lateral shoulders, a relatively rigid perforate plate supported at its opposite longitudinal sides upon said shoulders, means attached to the drum between said division strips and cooperating with said plate for holding the same in position against displacement, filter cloth extending over said plate, and means for securing said cloth in position over the surface of said plate.

4. In a drum type filter, a filter section comprising a pair of division strips extending longitudinally of the drum and having lateral shoulders, a relatively rigid perforate plate supported at its opposite longitudinal sides upon said shoulders, the width of said plate being less than the distance between the far edges of adjacent shoulders, means between the edges of said plate for holding the same in position against vertical displacement but allowing limited lateral movement thereof, filter cloth extending over said plate, and means for securing said cloth in position over the surface of said plate.

5. In a drum type filter, a filter section comprising a pair of division strips extending longitudinally of the drum and having lateral shoulders, a relatively rigid perforate plate of a width less than the distance between the far edges of adjacent shoulders and supported at its opposite longitudinal sides upon said shoulders in a manner for limited lateral movement thereon, means between the edges of said plate for holding the same in position against vertical displacement but allowing limited lateral movement thereof, filter cloth extending over said plate, and means for securing said cloth in position over the surface of said plate.

6. In a drum type filter, a filter section comprising a pair of division strips extending longitudinally of the drum and having longitudinal grooves and lateral shoulders, a relatively rigid perforate plate supported at its opposite longitudinal side upon said shoulders, means between the edges of said plate for holding the same in position against displacement, filter cloth extending over said plate and into the grooves of the respective division strips, and means for securing said cloth within said grooves.

7. In a drum type filter, a filter section comprising a pair of division strips extending longitudinally of the drum and having lateral shoulders, a relatively rigid perforate plate supported at its opposite longitudinal sides upon said shoulders, said plate having a series of openings between its longitudinal edges, screw-threaded studs carried by said drum and extending into said openings, means associated with said studs for forcing said plate downwardly and holding the same against vertical displacement, means for limiting downward movement of said plate, filter cloth extending over said plate, and means for securing said cloth in position over the surface of said plate.

ROBERT GEORGE ALBERT WEISS.